UNITED STATES PATENT OFFICE.

JOHN R. HAZELET, OF WILLIAMSPORT, PENNSYLVANIA.

IMPROVEMENT IN ROOFING PAINTS OR COVERINGS.

Specification forming part of Letters Patent No. 216,850, dated June 24, 1879; application filed February 24, 1879.

*To all whom it may concern:*

Be it known that I, JOHN R. HAZELET, of Williamsport, in the county of Lycoming and State of Pennsylvania, have invented certain new and useful Improvements in Roofing Paints or Coverings, of which the following is a specification.

The present invention is a composition of iron and rubber for covering wood and metal surfaces, making it absolutely impervious to water, and forming an elastic coating that will not crack or scale off.

The composition is made of the following materials or ingredients, and in the proportions named: Seven gallons gasoline or coal-tar; three gallons asphaltum-varnish; twenty-five pounds oxide of iron, (or other metallic paint;) and one and one-half (1½) pound of india-rubber dissolved in benzine, (or other suitable solvent;) and one pound of resin, (melted in a small quantity of turpentine before mixing,) all thoroughly mixed with linseed-oil (raw or boiled) and Japan varnish.

I prefer to use the ingredients in about the above proportions specified; but I may vary in some degree therefrom, to suit different climates and classes of work, without departing from the spirit and intention of my invention.

In the use of my compound I may add powdered minerals or earthy matter, such as sand, slate, cement, &c., to the above compound, to reduce it to a semi-plastic state, so that it can be spread on the surface to be coated in comparatively thick layers; but I prefer using it without powdered materials, and in the ordinary manner—that is, applied with a brush.

In making the composition no heat is required to form a perfect union or commingling of all the parts, ingredients, or elements.

This paint or composition will expand or contract under the influence of heat or cold, and by this elasticity is prevented from cracking or peeling off.

The paint can be readily applied to surfaces that have been before covered with other paints or compounds, especially such as are mixed with oil and lead.

Having thus described my invention, what I consider new, and desire to secure by Letters Patent, is—

A paint or roofing compound consisting of the following materials or ingredients: gasoline or coal-tar, asphaltum-varnish, oxide of iron or other metallic paint, india-rubber dissolved in benzine or other suitable solvent, resin, (melted in small quantity of turpentine before mixing) all thoroughly mixed with linseed-oil (raw or boiled) and Japan varnish, substantially in the proportions set forth.

In testimony that I claim the foregoing as my own I affix my signature in presence of two witnesses.

JOHN R. HAZELET.

Witnesses:
 THOMAS W. LLOYD,
 J. H. BEIER.